April 27, 1971

H. C. MASON 3,576,721

SAMPLER AND INCUBATOR FOR VIABLE AND NONVIABLE
AIRBOURNE PARTICULATES

Filed Aug. 26, 1968

INVENTOR.
HERMAN C. MASON
BY
Ralph R. Pittman
Agent

INVENTOR.
HERMAN C. MASON

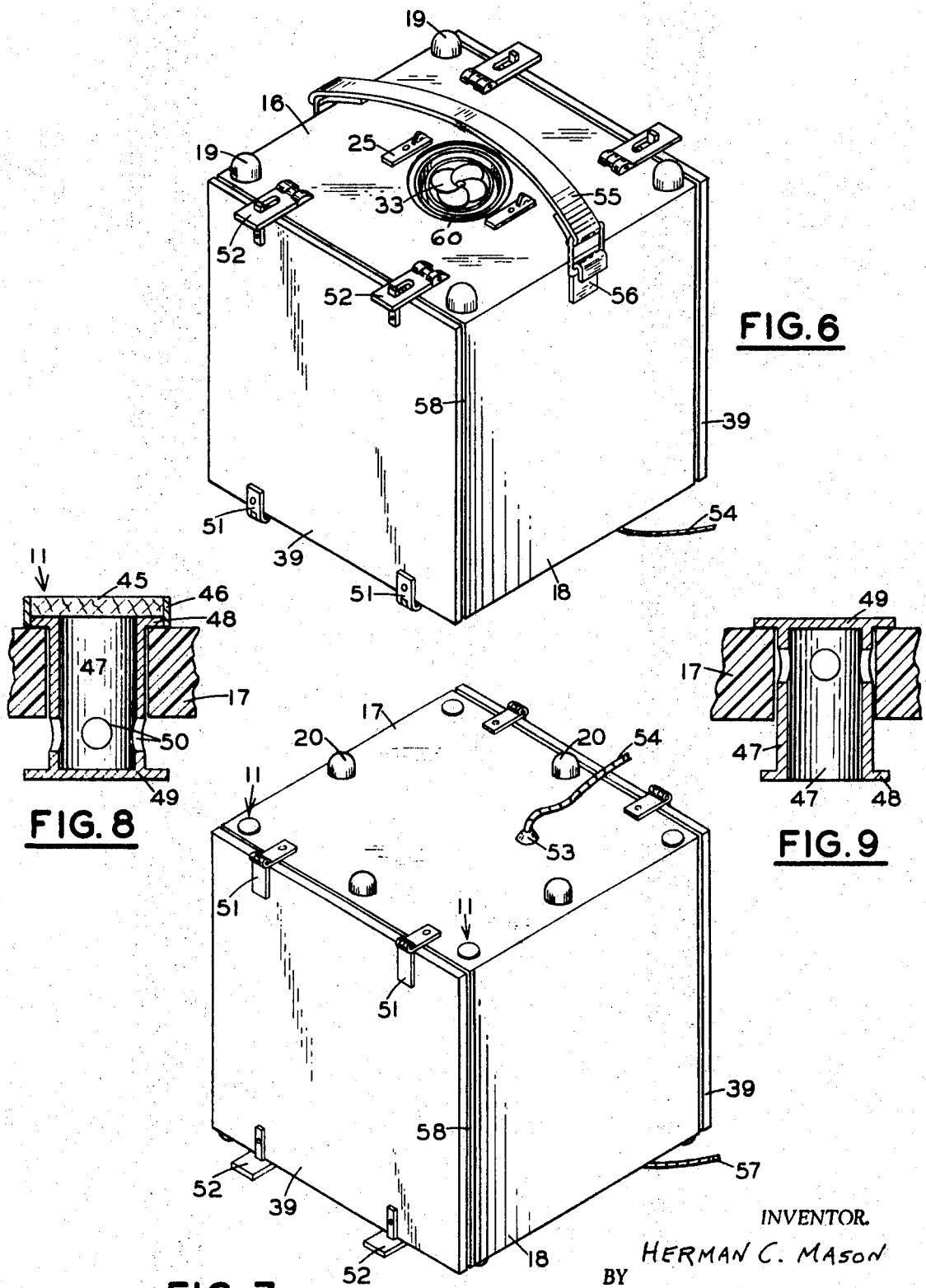

United States Patent Office 3,576,721
Patented Apr. 27, 1971

3,576,721
SAMPLER AND INCUBATOR FOR VIABLE AND NONVIABLE AIRBORNE PARTICLES
Herman C. Mason, 1909 Schiller St., Little Rock, Ark. 72202
Filed Aug. 26, 1968, Ser. No. 756,736
Int. Cl. C12k 1/04; C12b 1/04
U.S. Cl. 195—139                      11 Claims

ABSTRACT OF THE DISCLOSURE

A sampler and incubator for determining the concentration and character of both viable and nonviable particulates functions (1) in an upright standing position as a sampler when a conical centrifugal distributor with its associated fan is rotated for selectively depositing airborne particulates from environmental air on a group of sampling plates spaced around the distributor at least some of which have a nutrient coating and (2) in an inverted standing position as an incubator for effecting the in situ incubation of the inoculated nutrient media which may be produced by the deposition of viable particulates during the sampling procedure.

---

This invention relates generally to apparatus for analyzing air contamination, and more particularly to a combination sampler and incubator construction suitable for determining the extent and nature of environmental contamination, both viable and nonviable, through the deposition and subsequent examination of the airborne particulates.

Air purity is a matter of concern in any environment; it is of vital importance in many situations. Some of these are the nurseries, wards and operating theaters of hospitals; in pharmaceutical manufacturing areas; army camps and first aid quarters; and in areas subject to contamination by the radioisotopes of nuclear reactions.

To adequately assay atmospheric contamination, it is important as a preliminary procedure to determine the mass, size and nature of both the viable and nonviable particulates constituting the contamination.

This requires first of all the classification of the airborne particulates between viables and nonviables, a second step of classifying each group as to mass or size and a third step of incubating the pathogenic particles into colonies.

An object of the present invention is to provide means for enabling the accomplishment of these steps in a single sampling and incubating apparatus, so that the end products are in suitable condition for final analytical determination.

Another object is the provision in a particulate sampler of a centrifugal or rotary particulate classifying construction in which environmental air is caused to flow through a rotating conical classifier or distributor prior to the particulate deposition on the sampling dishes, to thereby classify the particulates as to mass or size.

A further object is the provision for converting the sampler to an incubator by simply attaching a cover to the intake opening, the cover carrying the heating and humidifying elements necessary for incubation, and inverting the container.

Another object is to provide an air sampler embodying a box-like container of rectangular cross section through which air is blown from a central inlet opening in the intake end of the container over the sampling dishes to exhaust openings at the respective lower corners of the opposite or exhaust end of the container, with filter elements at the exhaust openings.

A further object is the provision in an air sampler and incubator of gravity-operated exhaust valves which open when the associated container assumes an upright position and close in response to inversion of the container.

Another object is to provide an effective air sampling and incubating device which is simple in construction and one that is readily portable for easy transport to and from the environments to be examined for the presence of unwholesome or undesirable constituents.

Other objects and advantages will be pointed out or will be apparent from the following description and claims, taken in conjunction with the accompanying drawing illustrating the preferred embodiment of the invention, in which:

FIG. 1 is an elevational view of the invention, shown principally in section;

FIG. 2 is a plan view of the top of the intake end cover;

FIG. 3 is a plan view from below of the intake end cover, with the humidifying element removed;

FIG. 4 is a plan view of the humidifying element;

FIG. 6 is an isometric view showing the external appearance of the invention in the upright standing position for sampling;

FIG. 7 is an isometric view showing the external appearance of the invention in the inverted standing position for incubating;

FIG. 8 is a cross section of exhaust vent valve, in the position for sampling operation; and FIG. 9 is a cross section of exhaust vent valve with the filter element removed and in the position for incubating.

Figure 5:
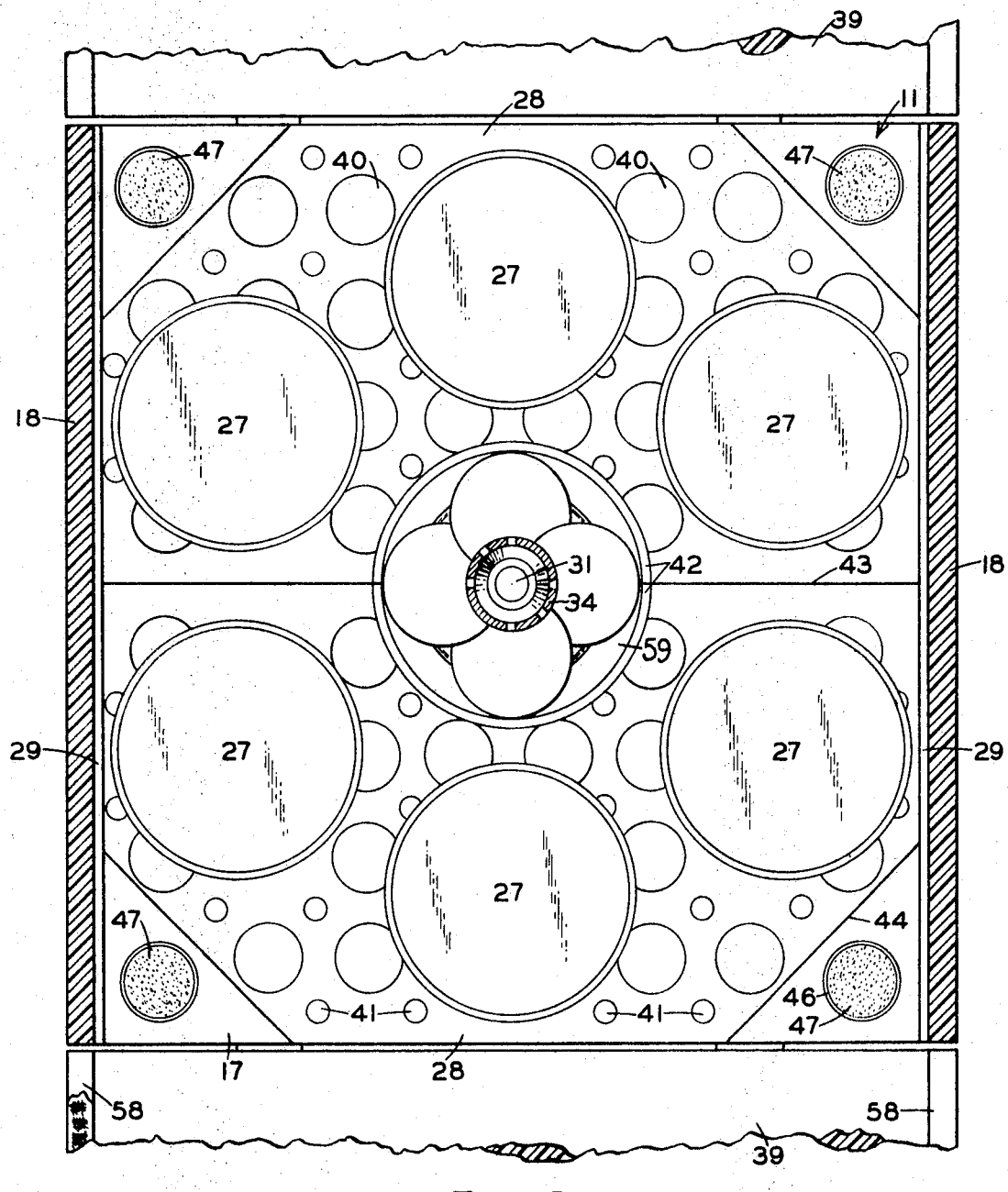
FIG. 5 is a sectional plan view of the invention, taken along the line 5—5 of FIG. 1.

In more detail, as shown generally in FIGS. 6 and 7, the box-like container 12, of rectangular cross section and preferably of some suitable plastic material (e.g. an acrylic resin), includes the fixed opposed side walls 18, to which are rigidly secured the intake end wall 16 and the opposed exhaust end wall 17, and the hinged opposed sides or doors 39 are hingedly mounted on the hinges 51 at one end and latched in the closed position by the latches 52, the gasket 58, extending around the periphery of the sides 39 and functioning as a seal to assure airtightness along the abutting surfaces.

The box-like container 12 is adapted to assume a stable upright standing position when supported by the spaced projecting legs or exhaust end supports 20, and a stable inverted standing position when resting on the spaced projecting legs or intake end supports 19, the legs at each end being of sufficient length to assure that the respective ends of the container will be suitably spaced from the surface on which it may be standing. A carrying strap 55, detachably engaged with the opposed pair of hooks 56, provides a convenient handle as it extends transversely above the intake opening 60.

As shown in FIGS. 1 and 5, a plurality of pairs of shelves 28, moulded of glass or a suitable thermo-plastic, are mounted for slidable movement into and out of the container when the hinged doors 39 are open. The shelf supports and guides 29 are rigidly secured in spaced parallel relationship to engage both sides of the respective end portions of the shelves, restraining their vertical movement whether the container is standing upright or inverted.

Each shelf of each pair of shelves has a semicircular opening about the central vertical axis of the container, so that a circular opening 59 is defined vertically through each pair to thus form a centrally positioned, vertically extending opening within the container and alongside the shelves when the inner ends of the shelves engage, as along the abutment line 43. In addition, each outer corner of each shelf is chamfered indicated at 44, thereby providing a vertically extending channel alongside the shelves in each corner of the container.

A centrifugal or rotary particulate distributor, extending vertically within the central openings 59, includes the shaft 31, to the upper end of which is secured the intake fan 33, and to the lower end of which is secured the hollow conical member 34, the latter extending so that its larger end adjacently faces the intake opening 60 at the elevation of the fan 33, the hollow conical member 34 being perforated along its length as indicated at the reference numeral 35. A second fan 32 is also rigidly secured to the shaft 31 at the smaller end of the conical member 34, so that both fans and the distributor cone rotate as a unit when the shaft 31 is rotated, as by the motor 30.

A plurality of particulate receiving members 27, herein illustrated as Petri dishes, are annularly disposed on the shelves 28, the vertically extending flange 42 of each shelf precluding the inadvertent contact of the Petri dishes with the moving distributor cone. To provide air passageways along both the upper and lower sides of the dishes, a plurality of horizontally spaced integral protuberances 41 extend vertically from both surfaces of the shelves 28, and to further aid in the distribution throughout the container of heat, moisture and air, a plurality of horizontally spaced openings 40 are provided through each of the shelves.

An intake end cover 10 is removably fitted over the intake opening 60, removably attachable to the container by means of the intake cover latch 25, the latter being pivotally associated with the pivot 26 to alternately engage or disengage the upper surface of the closure disk 21. As shown more in detail in FIGS. 2, 3 and 4, the upper surface of the closure disk has attached thereto the handling knob 37, and the electrical receptacle 38 passes through the disk to electrically connect to the circular heating element 22. Adjacent to, and coaxially spaced from the heating element 22 is the humidifier element 23, held within the retaining flange 36, and supported from the closure disk by the four turnable hooks 24.

At the respective corners of the exhaust end 17 of the container, and in alignment with the air passageways along each vertical inside corner of the container, are located the vent valves 11, shown in detail at FIGS. 8 and 9. Each vent valve includes the tubular portion 47 the length of which exceeds the thickness of the wall of the exhaust end 17 through which it extends. The inner end of the tubular portion 47 is open and in communication with the interior of the container, and is formed with an outwardly extending flange 48, while the outer end is closed by the closure portion 49, the latter extending outwardly to provide an outer end flange portion. The tubular portion 47 is free to move endwise through the exhaust end wall under the influence of gravity, this movement being limited by the engagement of one or the other of the flanged portions with the exhaust end wall 17.

When the container is in the upright standing position for sampling, the valve 11 assumes the open position illustrated in FIG. 8, in which the peripherally spaced openings 50 adjacent the closed end of the tubular portion 47 provide communication between the inside of the container and the outer atmosphere. If desired, a filter 45, with its retaining sleeve 46 fitted over the flange 48, may be interposed to collect airborne particles from air moving from the sampler. The porosity of the filter 45 is adapted to the air conditions encountered, and may vary from millipore to a relatively coarse medium.

When the container is inverted for an incubating procedure, the valve 11 assumes the closed position illustrated at FIG. 9, in which movement of air therethrough is precluded by the engagement of the flanged portion 49 with the abutting portion of the exhaust end wall 17, and further by the retraction of the vent openings 50 into the associated wall opening.

An electrical supply cord 54 is shown connected to the electric receptacle 53 to indicate a source for energizing the variable speed motor 30. It is preferable that the speed of the motor be capable of selective variation between about 30 r.p.m. and about 3600 r.p.m., the lower speeds for incubating and the higher speeds for sampling. A suitable motor control for such a wide speed variation is available from well known calibrated silicon controlled rectifiers, not illustrated herein.

While a motor has been shown and described, it will be clear that any suitable means for rotating the rotary member of the invention may be used; in locations where electrical energy is unavailable, a manually operated hand crank arrangement may be substituted for the motor here shown.

For operation as a sampler, the intake cover 10 is removed with the container disposed in the upright standing position illustrated at FIG. 6. The motor is energized for relatively high speed operation, and the rotation of the upper fan starts environmental air moving into the conical distributor. Here the airborne particulates are separated according to mass or size, and selectively blown through the perforations 35 of the distributor impinge upon the annularly spaced particulate receiving dishes 27 as the air moves from the distributor along and through the shelves 28 to the air passageways along the vertical corners of the container and thence through the filters 47 of the vent valves 11 to the outside atmosphere. Some of the receiving dishes may be Petri dishes containing a layer of microorganism growth media, and others simply impervious, porous or suitably coated paper for gathering nonviable particles.

Following a sampling routine, the deposits of nonviables are removed for examination, and the in situ incubation of the inoculated growth medium is accomplished by placing covers over the exposed Petri dishes, moistening the humidifier sponge 23, latching the intake cover 10 in place, attaching the electrical supply cord 57 to the heater receptacle 38, inverting the container, and setting the motor at a low speed to enable the fans 32 and 33 to circulate the warm moist air throughout the interior of the now closed container for the desired period of incubation. Various well known timers and maximum indicating thermometers may of course be used as desired with the invention.

What I claim as my invention and desire to secure by Letters Patent of the United States is:

1. In a sampler and incubator for airborne particulates which includes a casing, an intake opening therein and at least one particulate receiving member inside the casing, the improvement which comprises a centrifugal particulate distributor disposed for moving particulates from said intake opening to said particulate receiving member, said distributor including a perforated hollow conical member the larger end of which adjacently faces said intake opening and a fan at said larger end rotatable therewith for moving airborne particulates into said hollow conical member and thence through the perforations thereof to said particulate receiving member, and means for rotating the distributor.

2. A sampler and incubator for determining the concentration and character of airborne particulates, comprising a casing located in the environment to be examined, a plurality of particulate receiving members inside the casing, an exposed coating of a nutrient medium on said members, rotary means including a hollow conical perforated particulate distributor for moving environmental air to contact the nutrient coating to effect deposition thereon of airborne particulate matter, and means for effecting in situ incubation of the inoculated nutrient medium, said last-named means including a heating element disposed within said casing.

3. The sampler and incubator defined in claim 2, including means for centrifugally dividing the airborne particulates among the particulate receiving members in accordance with their respective weights.

4. A sampler and incubator for viable and nonviable airborne particulates comprising a box-like container adapted for alternatively standing upright or inverted and including a pair of opposed hinged sides and an intake end and an exhaust end, a centrally disposed intake opening in the intake end, a plurality of exhaust openings in the exhaust end, a plurality of vertically spaced pairs of shelves within the container, holding means engaging each shelf at its respective ends for restraining vertical movement of the shelves, said holding means guiding the slidable movement of each shelf into and out of the container from the hinged sides thereof, a central opening extending vertically in mutual coaxial relationship through each pair of shelves, a plurality particulate receiving members carried by said shelves between said central opening and the respective sides of the container, a centrifugal particulate distributor extending vertically in said central opening alongside said shelves, said distributor including a perforated hollow conical member the larger end of which adjacently faces said intake opening and a fan at said larger end rotatable therewith for selectively moving airborne particulates from said intake opening to said particulate receiving members via the perforations of said centrifugal particulate distributor, and means for rotating the distributor.

5. The sampler and incubator as claimed in claim 4, in which spaced protuberances projecting from both horizontal surfaces of each shelf are disposed to maintain the particulate receiving members in spaced relationship with said surfaces.

6. The sampler and incubator as claimed in claim 4, wherein the vertical spacing of the shelves is substantially equal to the height of said particulate receiving members.

7. The sampler and incubator in accordance with claim 4, in which a plurality of horizontally spaced openings extend vertically through each shelf.

8. The sampler and incubator as recited in claim 4, wherein each outside corner of each shelf is chamfered to provide a vertically extending air channel along each outside corner of the container, and the exhaust openings extend vertically through the exhaust end of the container at each corner thereof in alignment with the air channel.

9. The sampler and incubator as recited in claim 4, in which at least one of said particulate receiving members has an exposed coating of a nutrient medium adapted for growing viable particulates.

10. The sampler and incubator as recited in claim 4, in which a closure is removably fastened over the centrally disposed intake opening, said closure having mounted on the inner side thereof a heating element and humidifying element, a valve having an open position and a closed position associated with each exhaust opening and extending through the exhaust end of said container, the valves assuming the open position when the container is in the upright position and a closed position in response to movement of the container to the inverted position, and means for energizing said heating element.

11. The sampler and incubator as claimed in claim 10, wherein a filter element is disposed over the inner end of at least one of the valves.

References Cited
UNITED STATES PATENTS

| | | | |
|---|---|---|---|
| 2,860,776 | 11/1958 | Hays | 209—144 |
| 2,894,877 | 7/1959 | Sinden | 195—103.5 |
| 3,001,914 | 9/1961 | Andersen | 195—103.5 |

ALVIN E. TANENHOLTZ, Primary Examiner

U.S. Cl. X.R.

195—103.5, 142; 209—144; 73—28